Feb. 3, 1970        F.V. DOTEN        3,493,077
FOLDING STAIRWAY FOR AUTOMOBILE CAMPER AND THE LIKE
Filed Nov. 8, 1968
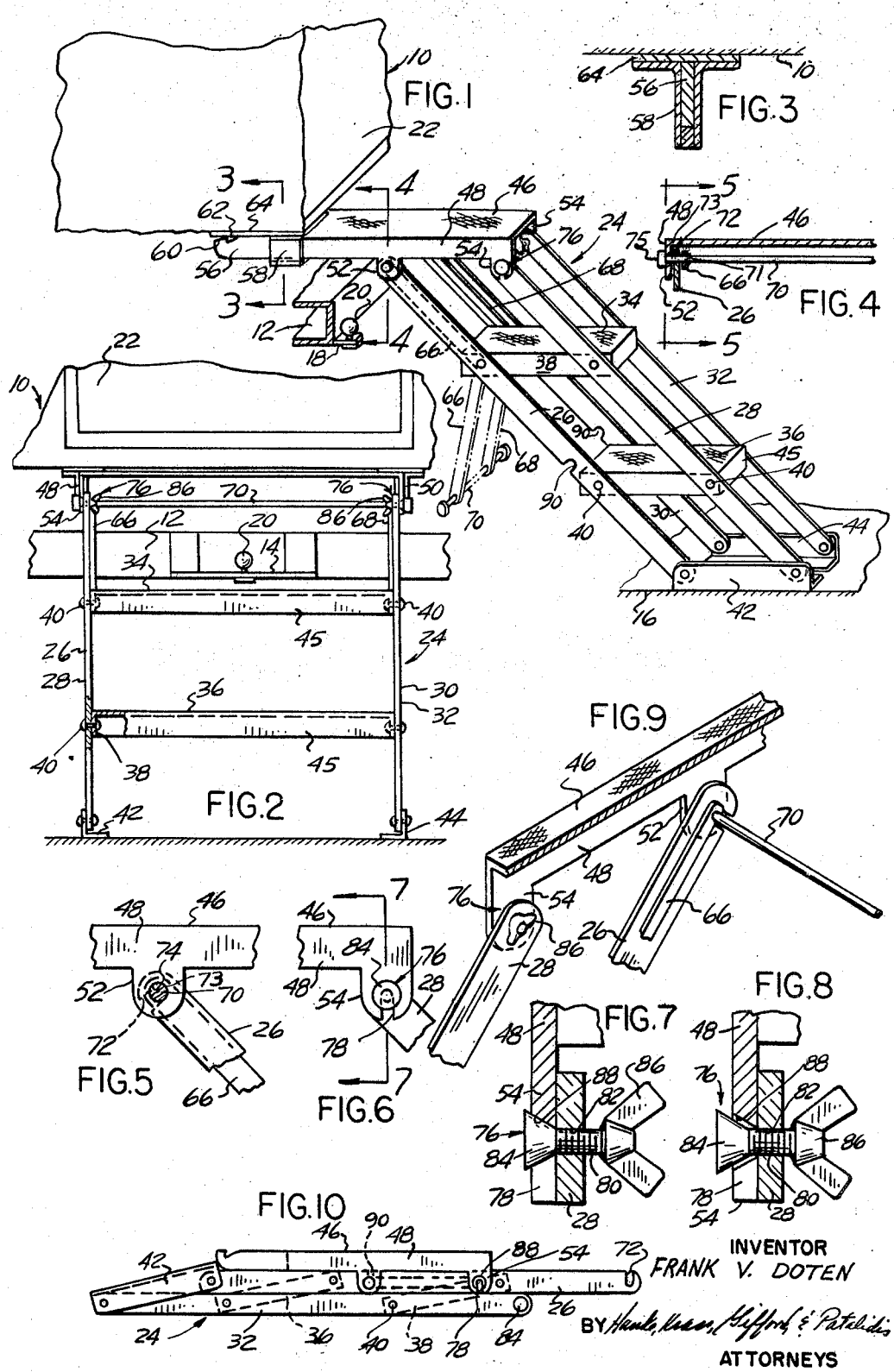
INVENTOR
FRANK V. DOTEN
BY *Hanks, Mason, Gifford & Patchides*
ATTORNEYS

United States Patent Office 3,493,077
Patented Feb. 3, 1970

3,493,077
FOLDING STAIRWAY FOR AUTOMOBILE CAMPER AND THE LIKE
Frank V. Doten, 23113 Easterling,
Hazel Park, Mich. 48030
Filed Nov. 8, 1968, Ser. No. 774,313
Int. Cl. E06c 9/08
U.S. Cl. 182—96
8 Claims

ABSTRACT OF THE DISCLOSURE

A folding stairway for automobile camper and the like having two pair of parallel side rails pivotally supporting step members therebetween. The stairway has an upper platform having two pair of downwardly projecting parallel lugs. A pair of lugs is removably fastenable to the end of two side rails and the other pair of lugs is pivotally fastened to the end of a pair of parallel links pivotably attached to the other side rails, such that the platform may be clamped in position and attached to the camper with the stairway unfolded. When the stairway is folded, the platform remains attached to the side rails by means of the links and is closely juxtaposed to the closely juxtaposed side rails so as to form a substantially flat package that may be stowed away in any convenient place.

BACKGROUND OF THE INVENTION

The present invention relates to foldable stairways and more particularly to foldable stairways for use with an automobile camper, a house trailer, or the like. Automobile campers consist of a body forming an enclosure for living quarters which is adapted to be mounted on the flat bed of a motor vehicle of the "pickup" truck type or the like. The camper body is removably attached to the vehicle such that it may be lifted by means of a hoist or jacks and removed from the motor vehicle if so desired.

Motor vehicles of the pickup truck type are often provided with a rear bumper which is normally situated a considerable distance from the ground such that the bumper, even if provided with a step, is difficult to reach for the purpose of entry and egress from the camper through the rear door thereof. Folding steps, attachable to the pickup truck rear bumper, are commercially available, but they are fragile, they lack stability and rigidity, and they are considerably unsafe in use. In addition, such folding steps as commercially available generally provide only one additional step between the pickup truck rear bumper and the ground, resulting in a substantial high reach which is straining and dangerous for aged persons and children.

Ground supported short folding ladders or steps are also often used as a stairway for entry and egress from a camper, house trailer and the like. Such makeshift stairways are unsafe as they are not provided with sufficient rigidity and steadiness, have not attachment to the camper body or to the truck body, and they are supported directly by a ground which may be soft or uneven.

The present invention provides a folding stairway which, in its erected position, forms a strong rigid assembly attached to the camper body, or the like, with an upper platform or landing which may be of any appropriate size and which is pivotally attached to the stairway in such manner that when the stairway is in a folded position, the platform is closely juxtaposed to the folded stairway such as to form a unit which may be easily stowed in any appropriate location.

SUMMARY OF THE INVENTION

The present invention provides a folding stairway for automobile campers and the like which, in the folded position, forms a compact substantially small sized package and which, in the erected position forms a strong, sturdy and rigid stairway providing easy and safe access to the entrance door of a camper, house trailer or the like.

The many objects and advantages of the present invention will become apparent to those skilled in the art when the following description of an example of the best mode contemplated for practicing the invention is read in conjunction with the accompanying drawings.

BRIEF DESCRIPTION OF THE DRAWINGS

FIG. 1 is a schematic perspective view of the folding stairway of the present invention shown in an erected condition and attached to a camper body;

FIG. 2 is rear elevation view thereof;

FIG. 3 is a fragmentary sectional view from line 3—3 of FIG. 1;

FIG. 4 is a fragmentary sectional view from line 4—4 of FIG. 1;

FIG. 5 is a fragmentary enlarged detail view from line 5—5 of FIG. 4;

FIG. 6 is a fragmentary enlarged side elevation view showing the clamping assembly of the upper platform of the folding stairway of the invention upon the end of a side rail;

FIG. 7 is a sectional view along line 7—7 of FIG. 6 showing the clamping assembly in the clamped position;

FIG. 8 is a view similar to FIG. 7 but showing the clamping assembly in a position permitting dismantling and folding of the stairway of the invention;

FIG. 9 is a schematic fragmentary perspective view of a portion of the folding stairway of the present invention; and FIG. 10 is a side elevation view of the folding stairway of the present invention in its folded condition.

DETAILED DESCRIPTION OF THE PREFERRED EMBODIMENT

Referring now to the drawings, and more particularly to FIGS. 1–2 thereof, there is shown a camper body 10 which is normally mounted on a motor vehicle of the pickup truck type (not shown) having a rear bumper 12 for example provided with a recessed step 14 (FIG. 2) disposed a relatively high distance from the ground 16 and further encumbered by a hitch extension or lug 18 on which is mounted the usual hitch ball 20. The camper body 10 extends over the rear bumper 12 and has a rearwardly disposed door 22 for entry into and egress from the interior of the camper body 10.

The present invention, in the example illustrated, is shown as being in the form of a folding stairway assembly, generally designated at 24, having a first pair of parallel coplanar side rails 26 and 28 and a second pair of similarly disposed parallel coplanar side rails 30 and 32.

A pair of flat rigid step plates, shown at 34 and 36, having their upper surface preferably formed of or covered with a non-slip surface, are disposed between the pairs of side rails 26–28 and 30–32 respectively. Each of the step plates 34 and 36 has its lateral edges bent at right angle so as to define a pair of parallel side flanges, as shown at 38, which are provided with spaced pivotal mounting means, as shown at 40 for pivotal attachment to the pair of side rails 26–28 and 30–32. Pivotal mounting means 40 may be in the form of rivets or bolts, or the like, such as to permit the stairway 10 to be freely erected in any convenient position as shown in FIGS. 1 and 2, or to be collapsed as shown at FIG. 10, each one of the pair of side rails 26–28 and 30–32 in combination with the inter-connecting step plates 34 and 36 thus defining a deformable parallelogram. The corresponding ends of each of the side rails of a pair, such as side rails 26 and 28, are pivotably interconnected by way of a longitudinal elongated brace plate 42, the pair of side rails 30 and 32 being pivotably interconnected by means of a similarly disposed longitudinal brace plate 44. In order to provide improved transverse rigidity to the step plates 34 and 36, each is preferably provided with a bent down transverse edge portion 45.

A platform 46, having its top surface formed so as to be substantially non-slippery, is provided with a pair of downwardly bent integral parallel side flange portions 48 and 50 each having a pair of downwardly projecting integral spaced apart lugs 52 and 54 as best shown in FIG. 1 relatively to platform side flange portion 48. The forward end of each platform side flange portion projects, as shown at 56, beyond the area of the platform 46 such that both such projecting portions of the platform side flange portions are normally disposed through a gusset member 58 welded or otherwise fastened to the surface of the bottom panel of the camper body 10. Each of the projecting portions has a notch, as at 60 which is engageable by a ratchet-like member 62 mounted proximate the end of a flat spring 64 such that when the projecting portions 56 of the platform 46 are engaged through the gussets 58, the platform is held in position. The platform may be removed by manually depressing the springs 64 in a direction that release the ratchet-like member 62 from engagement in notches 60. Alternately, the gussets 58 may be made deeper than the height of the projecting portions 56 of the platform and the ratchet-like member 62 may be fixedly attached to the bottom panel of the camper body such that the platform 46 may be attached in position and removed by a slight upward tilt and pull action.

As shown in FIGS. 1–2, 4–5 and 9, a pair of link members 66 and 68 have one of their ends mounted for pivotal motion around the pivot support 40 of step plate 34, being disposed respectively between a side flange 38 of the step plate and the inner face of opposite side rails 26 and 30. The other ends of link members 66 and 68 are rigidly interconnected by means of a cross bar 70 passing through appropriate apertures 71 (FIG. 4) and welded in place. The upper end of the side rails 26 and 30 are each provided with a notch 72, best seen in FIG. 5, in which the projecting portions 73 of cross bar 70 is engaged, when the stairway 24 is in the erected position of FIGS. 1–2, the extreme ends of the projecting portions 73 of cross bar 70 being permanently pivotably attached to the lugs 52 of the platform 46 by being passed through apertures 74 in each lug 52, the cross bar 70 being permanently held pivotally relatively to such lugs by means of an enlarged head 75 as shown at FIG. 4, or any other convenient means, on each end of the cross bar. In addition to the platform 46 being thus held on the upper end of side rails 26 and 30 as a result of the ends 73 of cross bar 70 being engaged in notches 72, when the stairway 24 is in the erected position of FIGS. 1–2, the platform 46 is rigidly clamped on the end of rails 28 and 32 by means of a fastening and clamping assembly generally designated at 76. As best seen in FIGS. 6–8, the platform lugs 54 have each a notch 78 permitting passage therethrough of a threaded member 80 disposed in a threaded transverse bore 82 in the upper end of each of side rails 28 and 32, as illustrated relatively to side rail 28. The threaded member 80 has on one end thereof a tapered enlarged head 84, projecting on the side of side rails 28 adjoining platform lug 52, and the other end of the threaded member 80 has a driving means, such as a wing nut 86, permanently attached thereon such as by welding, as shown, or by a cross pin, or the like. By rotating the wing nut 86, threaded member 80 may be threaded in and out such that its conical head 84 projects more or less relative to the side rail 28. With the conical head 84 projecting to the position shown in FIG. 8, the notch 78 of lug 54 may be slipped over the threaded member 80 and the head 84 such that the platform may be connected to the side rails 28 and 32 with the stairway 24 unfolded and erected in the position of FIGS. 1–2. Each wing nut 86 is then rotated such that the conical end 84 of the threaded member 80 engages a conical or tapered recess 88 formed in each platform lug 54, such conical or tapered recess 88 having an axis common with the axis of the threaded member 80.

When it is desired to remove and fold the stairway 24, the erected stairway is detached from the camper body 10, each of both wing nuts 86 is rotated so as to free the tapered head 84 from the tapered recess 88 in platform lug 54, and the platform 46 is rotated so as to free the notches 78 of the platform lugs 54 from surrounding the projecting end of both threaded members 80 and tapered heads 84. The ends 73 of rod member 70 are disengaged from the notches 72 on the end of side rails 26 and 30, and the platform 46 is swung, still attached to link members 66 and 68, such that the platform is disposed in close juxtaposition with the side rails 26 and 30. The ends 73 of rod member 70 previously engaged in notches 72 are now engaged in appropriate locations on both side rails 26 and 30. It is obvious that notches 72 may be omitted, in which case, in the folded or collapsed state of the stairway in FIG. 10, the platform 46 will be a short distance away from side rails 26 and 30. In the folded or collapsed state as shown in FIG. 10, the side rails 28 and 32 of the stairway 24 are closely juxtaposed with the side rails 26 and 30 respectively, as a result of the deformable parallelogram arrangement defined by each of the two pairs of opposite side rails and the steps 34 and 36, conjointly with the longitudinal brace plates 42 and 44. The collapsed stairway, shown in FIG. 10, may thus be stowed away in any appropriate location, such as in a hanger disposed below the camper body, or on the side of the motor vehicle.

It can be seen that in the erected position, with clamping assemblies 76 duly drawn in, the whole stairway assembly when mounted under the camper 10 presents a sturdy and stable structure, longitudinally and laterally rigid, and the whole stairway can be folded or collapsed so as to form a package substantially small enough for appropriate stowage at any convenient location.

A foldable stairway according to the present invention may be manufactured of any convenient material such as steel, aluminum, aluminum alloys or a combination of the same.

Having thus described the invention by way of a typical example of an embodiment thereof given for illustrative purpose only, what is to be protected by United States Letters Patent is as follows.

I claim:

1. A folding stairway for an automobile camper and the like comprising two pairs of parallel coplanar side rails defining a first and a second pair of opposed side rails, at least one step disposed between said pairs of parallel coplanar side rails and pivotally connected thereto, a platform removably connectable to one end of said side rails, a pair of downwardly extending parallel first lugs dependent from said platform, fastening means for fastening each of said first lugs to one end of two opposed side rails of said first pair, a pair of downwardly extending parallel second lugs dependent from said platform, a pair of parallel link members each having an end pivotally connected to each one of said second lugs and another end pivotally connected to two opposed side rails of said second pair, a notch in the end of each one of said opposed side rails of said second pair, and means dependent from said pair of second lugs and from said parallel links engageable in said notch.

2. The folding stairway of claim 1 further comprising means on said platform for removable attachment to the automobile camper and the like.

3. The folding stairway of claim 2 wherein said means comprises a pair of projecting parallel members dependent from said platform engageable within a pair of support gusset members attached to said camper and the like, a notch in each of said projecting members and a ratchet like member for engagement in said notch.

4. The folding stairway of claim 1 wherein each of said fastening means comprises a threaded member threading in said side rail, an enlarged tapered head on the end of said threaded member adjacent said lug, means on the other end of said threaded member for rotating said member, a notch in each of said first lugs for clearing said threaded member and a tapered recess in each of said lugs for engagement with said tapered head when said threaded member is drawn tight.

5. The folding stairway of claim 4 wherein said means on the other end of said threaded member is a wing nut fixedly fastened to said end.

6. The folding stairway of claim 1 wherein said means dependent from said pair of second lugs and from said parallel links comprises a rigid cross bar transversely interconnecting said links and having a projecting portion on each end thereof engageable in each said notch in the end of each of said opposed side rails of said second pair.

7. The folding stairway of claim 6 further comprising a notch in each of said opposed side rails of said second pair intermediate the ends thereof and each disposed such as to accept the projecting portion of said cross bar when said stairway is folded with the coplanar side rails juxtaposed with each other and said platform juxtaposed with said opposed side rails of said second pair.

8. The folding stairway of claim 1 further comprising a pair of parallel longitudinal brace plates each pivotally connected to the other ends of the side rails of a pair.

References Cited

UNITED STATES PATENTS

| | | | |
|---|---|---|---|
| 2,682,671 | 7/1954 | Faure | 182—96 |
| 2,863,594 | 12/1958 | Shafer | 182—88 |
| 2,969,850 | 1/1961 | Hillis | 182—88 |
| 3,008,533 | 11/1961 | Haberle | 182—88 |
| 3,291,255 | 12/1966 | Glatfelter | 182—88 |

REINALDO P. MACHADO, Primary Examiner

U.S. Cl. X.R.

182—88, 156